2,847,226

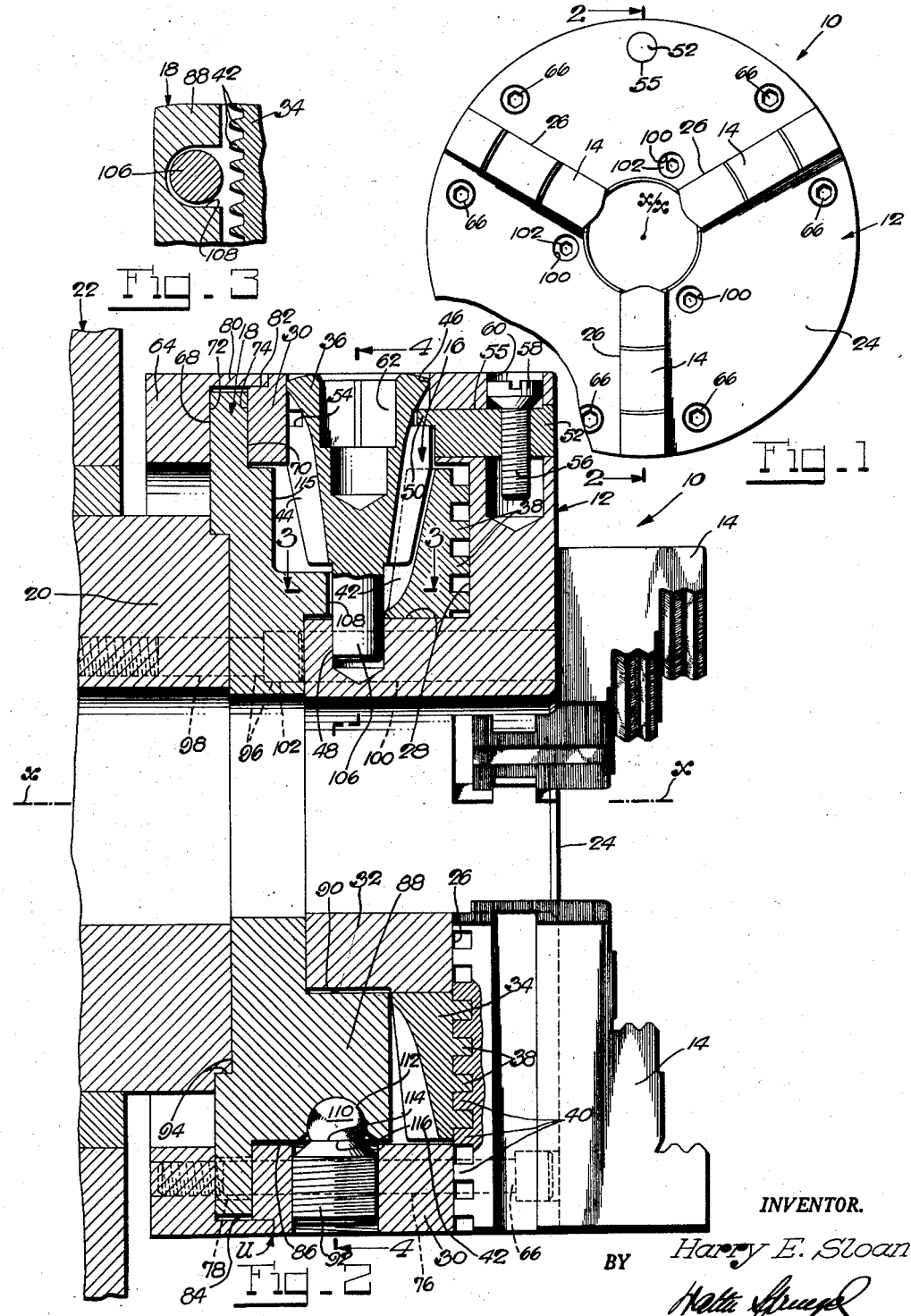

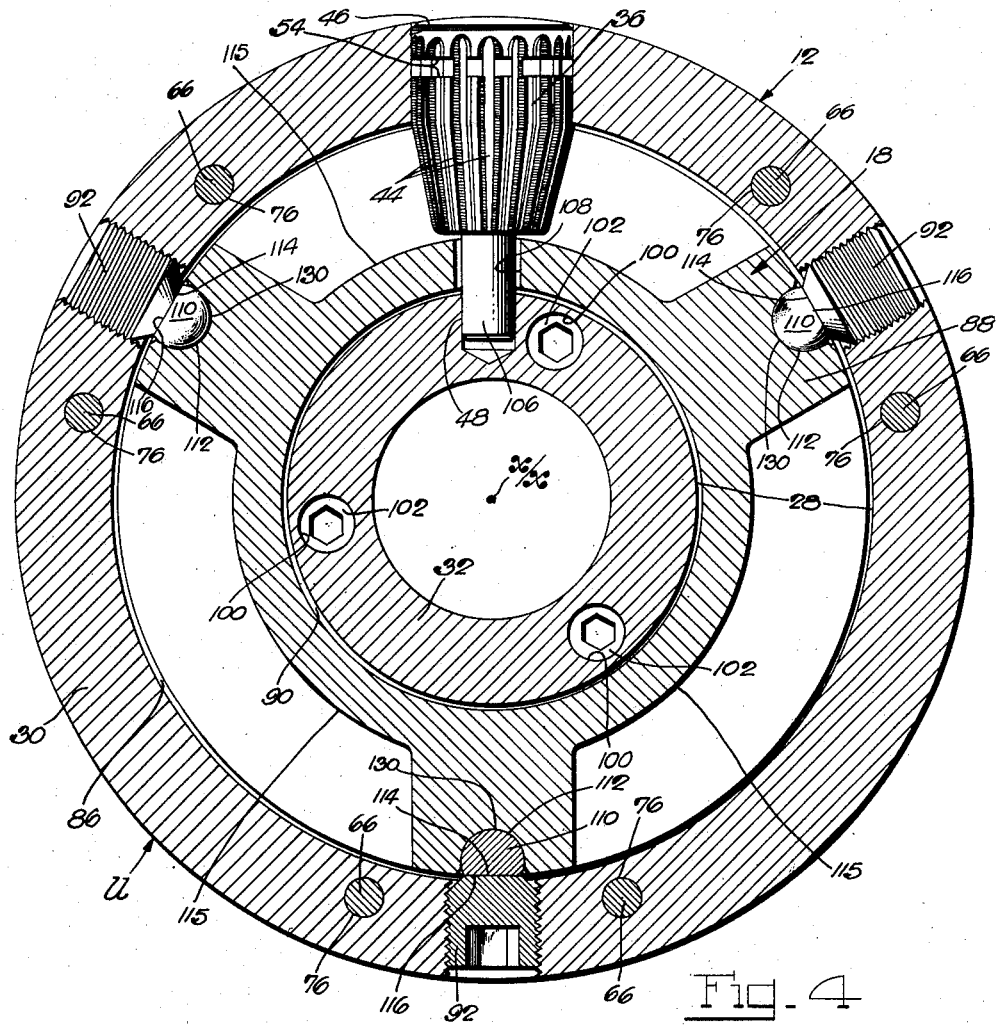
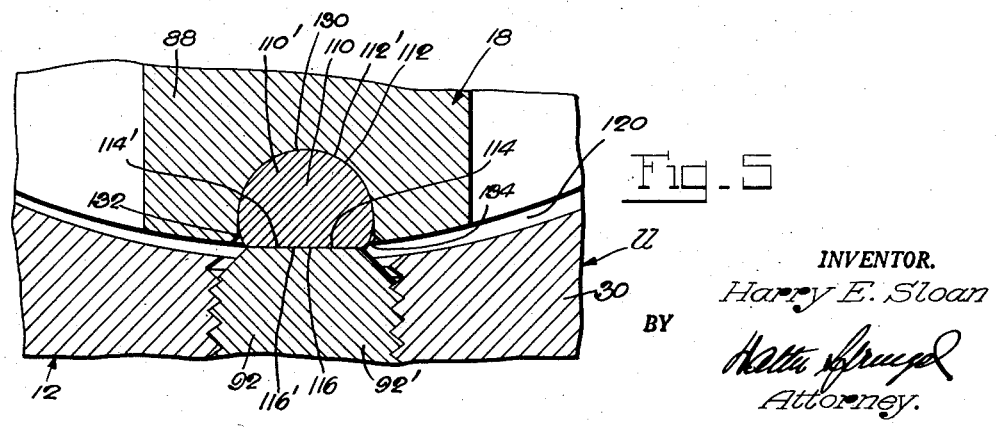

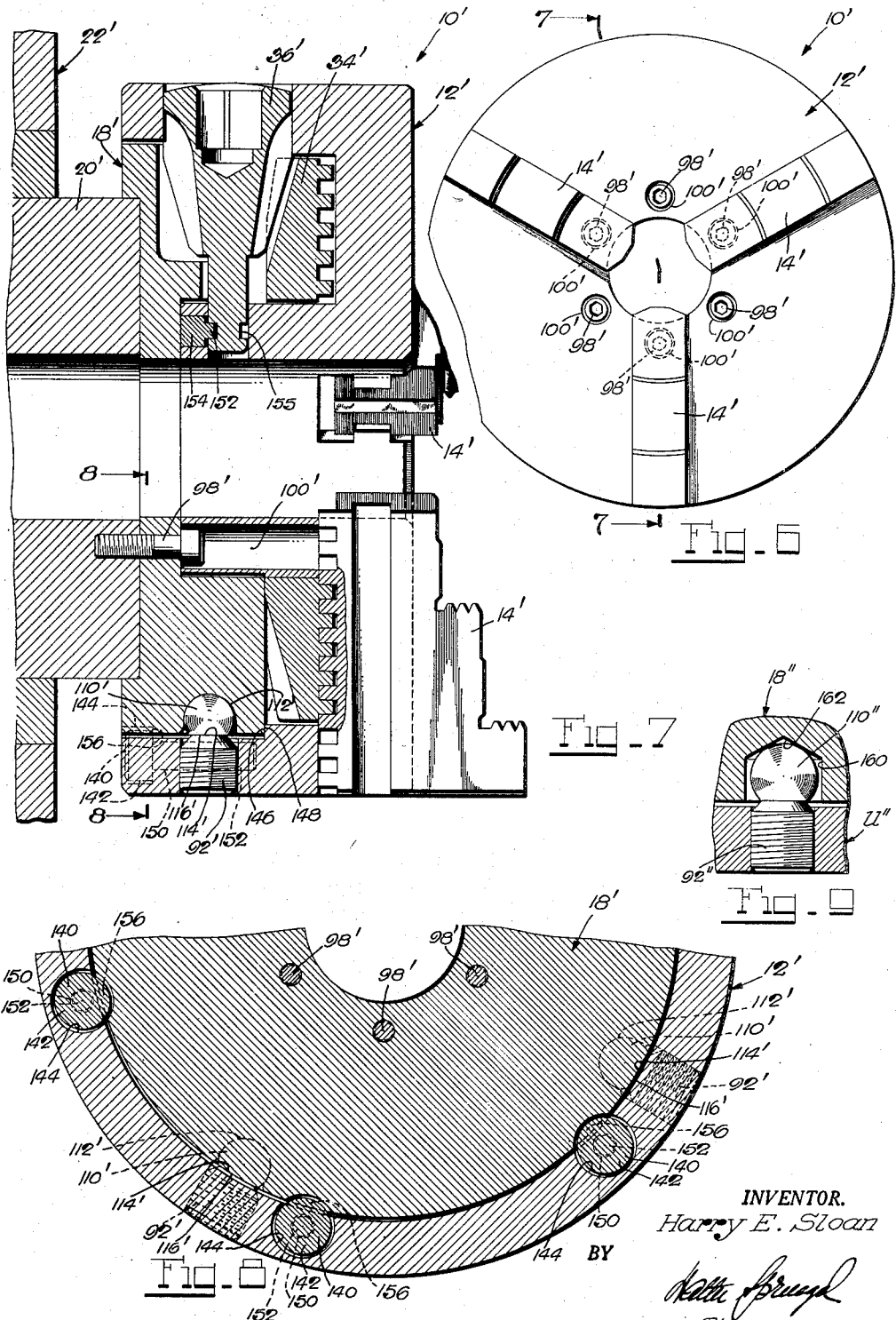

UNIVERSAL CHUCK OF THE CENTER-ADJUSTABLE TYPE

Harry E. Sloan, Hartford, Conn., assignor to The Cushman Chuck Company, Hartford, Conn., a corporation of Connecticut Application June 27, 1955, Serial No. 518,013

14 Claims. (Cl. 279—116)

This invention relates to chucks in general, and to universal chucks of the center-adjustable type in particular.

Universal chucks are characterized by jaw-operating mechanism which moves the chuck jaws simultaneously into and from gripping engagement with work. Generally, recourse is had to a well-known scroll disc which on rotation in opposite directions cooperates with the chuck jaws for their movement into and from gripping engagement with work. To permit the customary rotary mounting of the scroll disc in the chuck body, the latter is usually formed by complementary body sections of which the front section carries the jaws and rotatably supports the scroll disc, while the rear section retains the scroll disc on the front section in cooperating relation with the jaws. Universal chucks of the center-adjustable type have an additional mounting member or adapter by means of which the chuck is mounted on the power spindle of a lathe or other machine tool in universally adjustable fashion in a plane at right angles to the axis of the power spindle. To this end, the mounting adapter and adjacent rear body section of the chuck are adjustably connected by a plurality of angularly spaced radial set or adjustment screws which on appropriate manipulation shift the chuck relative to the mounting adapter until the center of work gripped by the chuck jaws coincides with the center axis of the mounting adapter and, hence, with the center axis of the power spindle on which the chuck is mounted through intermediation of the adapter. Customarily, the complementary body sections and rotary scroll disc of the chuck are held together as a unit by screws which are accessible at the front of the chuck. Additional screws, customarily accessible at the rear of the adapter and extending with clearance through holes in the latter, are threadedly received in the adjacent rear body section of the chuck and serve, when tightened, to hold the chuck in any center-adjusted position on the adapter, while permitting, when loosened, center adjustment of the chuck on the adapter on manipulation of the aforementioned set screws.

Customarily, the aforementioned radial adjustment screws are threadedly received in the chuck body and bear with their ends against a usually cylindrical boss on the mounting adapter. In consequence, engagement between the end of each adjustment screw and the boss on the mounting adapter is in any center-adjusted position of the chuck restricted substantially to a line, or at best a very narrow surface area, which, moreover, shifts with every adjustment of the chuck. Accordingly, the ends of these adjustment screws as well as the portions of the boss of the mounting adapter engaged thereby are subjected to prohibitive wear which causes their early deterioration to such an extent that the adjustment screws respond in their chuck adjustment no longer micrometer-like, but rather unpredictably, to rotation, with the result that center-adjustment of the chuck soon becomes a wearisome task. Moreover the quick wear of the ends of the adjustment screws and the portions engaged thereby of the boss of the mounting adapter would soon permit lateral play of the chuck from its center position, were it not for the fact that the overall clamping force of the holding screws in back of the adapter is relied on to transmit most, if not all, lateral operating stresses in the chuck directly to the adapter.

It is an object of the present invention to provide a universal chuck of the center-adjustable type in which the hitherto interposed rear body section between the front body section and the adapter is eliminated, and the front body section is, instead, directly mounted by holding screws on the adapter for center adjustment thereon as well as for retention of the scroll disc in cooperating relation with the jaws, thereby to permit the construction of a chuck of this type of considerably shorter axial dimension than was possible heretofore and thus meet the pressing demand for axially more condensed chuck constructions.

It is a further object of the present invention to provide a universal chuck of the center-adjustable type in which the ends of the aforementioned radial adjustment screws have throughout their areas perfect surface-to-surface engagement with the mounting adapter in any adjusted position of the chuck and also during any center adjustment of the latter, thereby not only to achieve assured micrometer-like chuck-adjustment response to rotation of these screws throughout the entire useful life of the chuck, and also prevent to all practical intents and purposes the subjection of these screw ends and of the mounting adapter to any wear that would afford the chuck even the slightest lateral play from its accurately adjusted center position even after a long period of time, but further permit complete reliance on these screws indefinitely to hold the chuck in any adjusted position and safely transmit all operating stresses therein, including torsional stresses, to the mounting adapter without any help from the aforementioned holding screws, and thereby permit center adjustment of the chuck on mere manipulation of the adjustment screws and without any manipulation of the holding screws which may be left sufficiently tightened securely to retain the chuck parts in their axially assembled relation without overly resisting adjustment of the chuck proper relative to its mounting adapter.

Another object of the present invention is to provide a universal chuck of the center-adjustable type in which the aforementioned surface-to-surface engagement of the ends of the adjustment screws with the mounting adapter is achieved by machining these screw ends flat and interposing between them and the mounting adapter ball or roller-like links which are seated and turnable in correspondingly shaped sockets in the adapter and have machined flats which confront and are engaged by the flat ends of the adjustment screws, thereby compelling these links to remain in full surface-to-surface contact with the adjustment screws and respond to any slight rotational component motions of the chuck which accompany most of its center adjustments on the adapter, by turning in their sockets and relatively sliding on the flat ends of the adjustment screws to the slight extent necessary for their self-adjustment to the new location of the chuck on the adapter.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary front view of a universal chuck embodying the present invention;

Fig. 2 is an enlarged longitudinal section through the chuck as taken on the line 2—2 of Fig. 1;

Fig. 3 is a fragmentary section through the chuck as taken on the line 3—3 of Fig. 2;

Fig. 4 is a cross-section through the chuck as taken on the line 4—4 of Fig. 2;

Fig. 5 is a further enlarged fragmentary section through a part of the chuck;

Fig. 6 is a fragmentary front view of a chuck embodying the present invention in a modified manner;

Fig. 7 is an enlarged section through the modified chuck as taken on the line 7—7 of Fig. 6;

Fig. 8 is a fragmentary section through the modified chuck as taken on the line 8—8 of Fig. 7; and Fig. 9 is a fragmentary section through a part of a chuck embodying the present invention in a further modified manner.

Referring to the drawings, and more particularly to Figs. 1 and 2 thereof, the reference numeral 10 designates a universal chuck comprising a body 12 with work-gripping jaws 14 and jaw-operating mechanism 16, and an adapter disc 18 by means of which the chuck body 12 with its parts 14 and 16 is adjustably mounted on the power spindle 20 of a lathe or other machine tool 22 (Fig. 2).

The chuck body 12, being of usual cylindrical form, is in its front face 24 provided with equi-angularly-spaced radial guideways 26 for the jaws 14, and is in its rear provided with a ring-shaped recess 28, leaving the chuck body with a rearwardly extending peripheral skirt 30 and a central hub 32, both arranged concentrically with respect to the longitudinal chuck axis $x$—$x$.

The jaw-operating mechanism comprises, in the present instance, a conventional scroll disc 34 and a pinion 36 of which the former is received in the rear recess 28 in the chuck body 12 and journalled on the central hub 32 thereof (Fig. 2). The disc 34 is at its front provided with scroll-like ribs or teeth 38 which mesh with similarly formed teeth 40 in back of the jaws 14 and move the latter toward and away from the chuck center $x$—$x$ on rotation of the disc 34 in opposite directions, as will be readily understood. The disc 34 is at its rear provided with bevel teeth 42 that are in mesh with similar teeth 44 of the pinion 36 which is journalled at 46 and 48 in the skirt 30 and hub 32, respectively, of the chuck body 12. In order to hold the pinion 36 against axial removal from the chuck body 12, the key end 50 of a retainer pin 52 projects into a peripheral groove 54 in the pinion 36. The retainer pin 52 is received in a bore 55 in the chuck body 12, and is in this instance held therein by a transverse screw 56 the head 58 of which is fittedly received in a radial bore 60 in the chuck body. As usual, the pinion 36 is located within the peripheral confines of the chuck body 12 (Fig. 2), and is provided with a socket 62 for the reception of a suitable tool, such as an Allen wrench, with which to turn the pinion and, hence, the scroll disc 34, for operating the jaws 14.

In accordance with one aspect of the present invention, the adapter disc 18, by means of which the chuck is adjustably mounted on the power spindle 20 of a lathe as already mentioned, serves also as a separate but complementary part of the chuck body 12. To accomplish this, the chuck body 12 is, first of all, directly mounted on the adapter disc 18 for universal adjustment thereon within a limited range in a plane normal to the chuck axis $x$—$x$. To this end, the chuck body 12 is mounted on the front of the adapter disc 18 through intermediation of a retainer ring 64 in back thereof and a plurality of screws 66 which connect the chuck body and retainer ring and hold them in abutting relation with the adapter disc (Fig. 2). More particularly, the screws 66 serve to hold the front and rear faces 68 and 70 of the retainer ring 64 and chuck body 12 in abutting relation with the adjacent rear and front faces 72 and 74, respectively, of the adapter disc 18, all of these abutting surfaces being machined in planes normal to the chuck axis $x$—$x$ to permit the aforementioned adjustment of the chuck body and retainer ring on the adapter disc as long as the screws 66 are sufficiently loose. In the present instance, the screws 66 are received fittedly and with clearance in holes 76 and 78 in the chuck body 12 and adapter disc 18, respectively, and are threaded in the retainer ring 64, thus connecting the chuck body and retainer ring for adjustment as a single unit on the adapter disc. In the present instance also, the retainer ring 64 is provided with an axially depending peripheral skirt 80 which extends over the periphery of the adapter disc 18 and is fittedly received by a diametrically reduced end length 82 of the chuck body 12, thereby further compelling the chuck body and retainer ring, as well as the screws 66, to slide as a unit on the adapter disc into any adjusted position thereon. To permit the aforementioned limited adjustment of the chuck body 12, retainer ring 64 and connecting screws 66, hereafter referred to as "chuck unit U," suitable clearance is also provided at 84 between the periphery of the adapter disc 18 and the skirt 80 on the retainer ring 64 on the one hand (Fig. 2), and at 86 between the skirt 30 on the chuck body and a ring-shaped boss 88 on the adapter disc 18 on the other hand (Figs. 2 and 4). To the same end, clearance is further provided at 90 between the ring-shaped boss 88 on the adapter disc 18 and the adjacent end length of the central hub 32 on the chuck body 12 (Fig. 2).

Received in the rear skirt 30 of the chuck body 12 are a plurality, in this instance three, equi-angularly-spaced radial set screws 92 (Figs. 2 and 4) which on being turned in appropriate directions react with the boss 88 on the adapter disc 18 in adjusting the chuck unit U on the latter into any one of an infinite number of positions thereon within the limits imposed by the aforementioned clearances between the chuck unit and adapter disc.

The adapter disc 18 has also suitable provisions for its rearward attachment to the power spindle 20 of the lathe or other machine tool 22. In the present example, the rear face 72 of the adapter disc 18 is provided with an annular recess 94 for the fitted reception of a front length of the power spindle 20, thus accurately locating the adapter disc on the power spindle. Further, the adapter disc 18 is provided with a plurality of holes 96 for the reception, completely within the confines of this disc, of mounting screws 98 which are threadedly received in the power spindle 20. To permit ready mounting of the chuck and adapter disc assembly on the power spindle 20 or its removal therefrom, the chuck body 12 is provided with a plurality of longitudinal through-holes 100 (Figs. 2 and 4) which in any adjusted position of the chuck unit U on the adapter disc 18 are sufficiently aligned with the heads 102 of the mounting screws 98 to admit a suitable wrench to the latter.

As already mentioned, the adapter disc 18, by virtue of the direct but removable mounting of the chuck body 12 thereon, additionally takes the place of the customary separate rear body section of previous chucks of this type, by permitting the correct rear assembly of the scroll disc 34 with the chuck body in the first place while the latter is removed from the adapter disc, and also retaining the scroll disc in full and accurate mesh with the jaws 14 and also with the pinion 36 when the chuck body is mounted on the adapter disc. The scroll disc retaining function of the adapter disc 18 is performed by the boss 88 on the latter which extends into abutting relation with the scroll disc in its proper axial position (Fig. 2). The shank 106 of the pinion 36 extends in this instance through a slot 108 in the boss 88 on the adapter disc 18 (Figs. 2, 3 and 4), with sufficient clearance, however, to permit the aforementioned adjustment of the chuck unit U on the adapter disc within the prescribed limits.

The mounting of the chuck body 12 directly on the adapter disc 18 through intermediation of the retainer ring 64 and screws 66 is further advantageous in that it permits a chuck construction of minimum length measured forwardly from the power spindle on which it may be mounted. The present chuck construction is further advantageous in that all the holding screws thereof may be reached from the front of the chuck.

In accordance with another important aspect of the present invention, the set or adjustment screws 92 do not react directly with the boss 88 on the adapter disc 18, but rather through intermediation of ball-type links 110. Thus, equi-angularly-spaced part-spherical sockets 112 of a number equal to that of the set screws 92 are machined into the periphery of the boss 88 on the adapter disc 18, and the ball links 110, hereafter referred to simply as "balls," are seated and turnable in these sockets. Significantly, each of these balls 110 has a cut-away surface 114 which is preferably a machined flat, while the adjacent end surface 116 of the corresponding set screw 92 is similarly flat and preferably accurately machined in order uniformly to engage the flat surface 114 on the adjacent ball 110 throughout its area in the fashion shown in Figs. 2 and 4. To obtain a lightweight chuck construction, the boss 88 on the adapter disc 18 may conveniently be recessed at 115 between the sockets 112 therein (Figs. 2 and 4).

Whenever for any reason whatever, such as wear of any one or more of the parts of the instant chuck, it becomes necessary to re-center the chuck on the power spindle 20 by adjusting the chuck unit U on the adapter disc 18, as described, into a new position thereon, the flat end surfaces 116 of the set screws 92 will remain in full contact with the flats 114 on the respective balls 110 throughout the adjustment as well as thereafter. This is due to the fact that the balls, being free to turn in their respective sockets 112 and also slide with their flats 114 on the flat end surfaces 116 of the adjacent set screws 92, will readily adjust themselves to any position of the chuck unit on the adapter disc within the prescribed limits without losing full contact of their flats with the flat end surfaces of the adjacent set screws. This holds true even when adjustment of the chuck unit U on the adapter disc 18 is accompanied by a slight rotational component motion of the chuck unit, as is the case in most adjustments. In order better to understand the self-adjusting characteristic of the balls 110, Fig. 5 shows a somewhat exaggerated adjustment of the chuck unit U on the adapter disc 18. Thus, the chuck unit has in its adjustment not only been moved radially, but has also been turned quite considerably in a clockwise direction (Fig. 5) as evidenced by the gap 120 of considerably varying width between the skirt 30 on the chuck body and the boss 88 on the adapter disc. It will now be understood that in the course of this adjustment of the chuck unit on the adapter disc, the ball 110' in Fig. 5, being compelled to remain with its flat 114' in full surface-to-surface contact with the flat end face 116' of the adjacent set screw 92', must inevitably turn somewhat in its socket 112' and the flat end face 116' of the set screw 92' will somewhat slide on the flat 114' of the ball 110' in order that the latter may conform to the newly adjusted position of the chuck unit on the adapter disc.

Having thus achieved unfailing and full surface-to-surface contact between the balls 110 and set screws 92 during any adjustment of the chuck unit U on the adapter disc 18 and in any adjusted position of the former on the latter, it stands to reason that the flats 114 on the balls and the flat end surfaces 116 of the set screws are subjected to hardly any wear for a long period of time which may well extend to the life of the chuck. Furthermore, even if the flats 114 of the balls 110 and flat end surfaces 116 of the set screws 92 should show some slight wear due to their sliding on each other in consequence of numerous adjustments of the chuck unit on the adapter disc, such wear would be substantially uniform throughout their areas and, hence, not in the least detrimental to further accurate adjustments of the chuck unit and the ability of the balls and set screws safely and reliably to transmit all operating stresses in the chuck unit to the adapter disc for an indefinite length of time.

It is, of course, the substantially wearless engagement between the flats 114 on the balls 110 and the flat end surfaces 116 of the set screws 92 under any and all circumstances which makes for micrometer-like chuck-adjustment response of the set screws to their rotation ordinarily throughout the life of the chuck, and also for safe and reliable transmission of all operating stresses in the chuck unit U to the adapter disc 18 by way of the balls and set screws for an indefinite length of time. Since the balls 110 and set screws 92 are perfectly capable to transmit all operating stresses in the chuck unit U to the adapter disc 18 for an indefinite length of time, it is prefectly feasible to tighten the screws 66 sufficiently to hold the chuck body 12, adapter disc 18 and retainer ring 64 in their axially assembled relation without unduly resisting adjustment of the chuck unit on the adapter disc, and leave them so tightened during and after any adjustment of the chuck unit on the adapter disc, if desired.

As shown, the flats 114 on the balls 110 preferably subtend cut-away part-spherical portions of less than half the full spheres of the latter, though it is feasible and fully within the scope of the present invention to have these flats subtend cut-away part-spherical portions of more than half the full spheres of the balls. However, the more the cut-away portions of the balls subtended by the flats thereon increase beyond half the full spheres of these balls, the more wedge-like in action become the latter in transmitting stresses, and especially torsional stresses, in the chuck unit U to the adapter disc 18, with the result that the flats on these balls and the flat end surfaces of the adjacent set screws will not only be subjected to some wear, but even to uneven wear. On the other hand, this detrimental wedge-like action of the balls in transmitting stresses, and especially torsional stresses, in the chuck unit to the adapter disc, is greatly diminished to the extent where it is to all practical intents and purposes harmless if the cut-away portions of these balls subtended by the flats thereon are at least half the full spheres of the former. A simple mental vector analysis of the forces involved in transmitting the stresses, and especially torsional stresses, in the chuck unit to the adapter disc will bear this out.

In forming the flats 114 on the balls 110 so that the former subtend cut-away portions of less than half the full spheres of the latter, there is this additional advantage that the balls may be held more readily in a fixture for machining the flats thereon, although there is the further consideration of obtaining flats of considerable areas on these balls for their given sizes in order most effectively to transmit stresses of all kinds for the longest period and with the least wear.

For most condensed construction of the chuck, the sockets 112 in the adapter disc 18 are preferably of such depths that the flats 114 on the balls 110 therein are substantially flush with the periphery of the boss 88 on the adapter disc. In the case where the flats 114 on the balls 110 subtend cut-away portions of less than half the full spheres of the latter, the sockets 112 for the balls have semi-spherical bottoms 130 and are preferably continued cylindrically as at 132 (Fig. 5), even being chamfered as at 134, thereby permitting ready placement of balls in these sockets and also their removal therefrom for replacement with other balls, if this should be necessary.

While the instant chuck has been shown with an exemplary number of three balls 110 and three set screws 92, this being a minimum number, it is fully within the purview of the present invention, and it may in many chuck constructions of this type be preferable, to provide a greater number of angularly spaced balls and set screws. Also, while reference has been had throughout the foregoing description of the chuck to balls in cooperation with the set screws for adjusting the chuck unit on the adapter disc, equally advantageous results may be achieved on substituting rollers for the balls, wherefore the use of rollers in lieu of balls falls fully within the purview of the present invention and is considered a fully equivalent expediency. In the case of rollers, the sockets in the adapter disc would, of course, be partly roller-shaped with their axes extending parallel to the chuck axis x—x, and the flats on the rollers would cooperate with the flat end surfaces of the set screws in the same manner in which the flats on the balls cooperate with the flat end surfaces of the set screws.

While the mating surfaces of the balls 110 and set screws have been described as being preferably flat, they need not necessarily be so. Thus, substantially the same results may be achieved by machining in each ball a part-spherical seat, for instance, in which a semi-spherical end of the adjacent set screw is received and turnable therein. However, the flat mating surfaces of the balls and set screws are much preferred not only because they may be machined much easier than other possible mating surfaces, but also because they perform their designated functions in a superior manner.

Reference is now had to Figs. 6 to 8 which show a modified chuck 10' having all the advantages of the described chuck 10 and being even more advantageous than the latter by having an even smaller axial overall dimension. As in the described chuck 10, the scroll disc 34' of the instant chuck 10' is nested in the chuck body 12' and held in cooperative relation with the jaws 14' thereon by the adapter disc 18' which is mounted on the power spindle 20' of a lathe or other machine tool 22' by means of screws 98' accessible through holes 100' in the chuck body 12'. In this instance, however, the chuck body 12' is releasably mounted on the adapter disc 18' by means of screws 140 which are threaded into the chuck body from the rear thereof and whose heads 142 are received in complemental parts of annular recesses 144 in the adapter disc and chuck body and seated on the bottom surfaces of these recesses so as to hold the front face 146 of the adapter disc in firm engagement with an annular shoulder 148 in the chuck body. To this end, the drilled holes 150 in the chuck body 12' which are subsequently tapped for the reception of the threaded shanks 152 of the screws 140 may be counterbored to provide the recesses 144 for the screw heads 142 when the adapter disc 18' is with its front face 146 substantially seated on the annular shoulder 148 in the chuck body. The bevel pinion 36' for operating the scroll disc 34' is, as heretofore, journalled in the chuck body 12', but is in this instance held against axial movement by the key end 152 of a plug 154 of which the former projects into a peripheral groove 155 in the bevel pinion and the plug itself may have a sliding fit in the chuck body and is held against axial escape by the adjacent adapter disc 18'.

The chuck-centering provisions are, as in the case of the described chuck 10, in the form of equi-angularly spaced set screws 92' (numbering four in the present instance) which are threadedly received in the chuck body 12' and engage with their flat inner end surfaces 116' the flats 114' on the adjacent balls 110' in the semi-spherical sockets 112' in the adapter disc 18'. Preferably and advantageously, the set screws 92' and their associated balls 110' are arranged midway between those surfaces of the adapter disc 18' on the one hand and the chuck body 12, and holding screws 140 on the other hand which slide on each other on center adjustment of the chuck on its adapter disc 18' by means of the set screws 92. These relative sliding surfaces are formed on one side of the set screws and associated balls by the front face 146 of the adapter disc 18' and the annular shoulder 148 in the chuck body 12', and on the other side of the set screws by the bottoms 156 of the parts of the recesses 144 formed in the adapter disc and the parts of the screw heads 142 seated thereagainst. In thus arranging the set screws 92' and associated balls 110' midway of these relatively sliding surfaces of the adapter disc and chuck assembly, the reactive forces exerted on center adjustment of the chuck by the set screws 92' and associated balls 110' on the adapter disc and chuck body will have no tendency whatever to cock, and hence bind, the chuck body on the adapter disc, wherefore the chuck may be center-adjusted on the adapter disc with the least exertion of force and even while the chuck body and adapter disc remain firmly clamped together by the holding screws 140 as explained.

While in each of the chucks 10 and 10' the balls 110 and 110' have been described as being seated in part-spherical sockets 112 and 112', respectively, these sockets may advantageously be formed by drilled holes. Thus, Fig. 9 shows a socket 160 which is formed in the adapter disc 18" by a conventional drill whose customary tapered tip forms the substantially conical bottom 162 on which the ball 110" is seated and on which it may freely turn. The socket 160 is preferably also of larger diameter than the ball 110" therein, as shown, thereby to compel the ball to find its own seat on the bottom of the socket and accurately to remain seated thereat even if this seat should become worn. The action of the ball 110" thus seated in the drilled socket 160 is, on manipulation of the set screw 92" for adjustment of the chuck unit U" on the adapter disc 18", exactly the same as that of any of the balls in the part-spherical sockets in the adapter discs of the chucks 10 and 10'.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A universal chuck of the center-adjustable type, comprising a cylindrical body with a longitudinal axis having longitudinal through-holes, radial guideways in its front and a rear face lying in a plane normal to said axis and provided with an annular recess; jaws movable in said guideways; jaw-operating mechanism including a scroll disc turnable in said recess; an adapter disc provided with through-holes and having front and rear faces in planes normal to said axis and provisions for its rearward attachment to a support, and being with its front face in abutting relation with said rear face of said body to retain said scroll disc in said recess; a retainer ring in abutting relation with said rear face of said adapter disc; bolts having heads accessible at the front of said body and extending fittedly and with clearance through said holes in said body and adapter disc, respectively, and being threadedly received in said retainer ring for holding said body and retainer ring in abutting relation with said adapter disc and permitting sliding movement in any direction within a limited range of said body and retainer ring as a unit on said front and rear faces of said adapter disc; and angularly spaced radial set screws in said body and bearing against said adapter disc for adjustment of said unit thereon.

2. A universal chuck of the center-adjustable type as set forth in claim 1, in which said adapter disc is at its front provided with a diametrically reduced boss projecting into said recess with peripheral clearance therefrom, and said set screws bear against said boss.

3. A universal chuck of the center-adjustable type as set forth in claim 1, in which said retainer ring has a depending annular skirt extending over said adapter disc to said body.

4. A universal chuck of the center-adjustable type as set forth in claim 1, in which said body is over a rear length thereof diametrically reduced to provide a rearwardly facing annular shoulder, and said retainer ring has a depending annular skirt extending over said adapter disc and being fittedly received on said reduced body length and bearing against said shoulder.

5. In a universal chuck of the center-adjustable type having a chuck unit with a longitudinal axis, and an adapter unit having provisions for its attachment to a support and carrying said chuck unit for limited relative sliding movement thereon in any direction in a plane normal to said axis, the combination of a plurality of sockets in one of said units angularly spaced about said axis; balls seated and turnable in said sockets, respectively; and radial set screws in the other unit engaging with their end surfaces said balls, respectively, and being turnable to adjust said chuck unit in said plane on said adapter unit and hold the former in any adjusted position on the latter, each of said balls being in part cut away and the cut-away surfaces of said balls and respective engaging end surfaces of said set screws being so mated that they remain in uniform engagement with and relatively slide on each other on adjustment of said chuck unit on said adapter unit.

6. In a universal chuck of the center-adjustable type having a chuck unit with a longitudinal axis, and an adapter unit having provisions for its attachment to a support and carrying said chuck unit for limited relative sliding movement thereon in any direction in a plane normal to said axis, the combination of a plurality of sockets in one of said units angularly spaced about said axis; balls seated and turnable in said sockets, respectively; and radial set screws in the other unit engaging with their end surfaces said balls, respectively, and being turnable to adjust said chuck unit in said plane on said adapter unit and hold the former in any adjusted position on the latter, each of said balls having a flat and said end surfaces of said set screws being flat and engaging the flats on the respective balls.

7. The combination in a universal chuck of the center-adjustable type as set forth in claim 6, in which said sockets are part-spherical for fitted reception of said balls, respectively.

8. The combination in a universal chuck of the center-adjustable type as set forth in claim 6, in which said sockets in said one unit are formed by drilled holes therein on the substantially conical bottoms of which said balls are seated.

9. The combination in a universal chuck of the center-adjustable type as set forth in claim 6, in which said sockets in said one unit are formed by drilled holes therein on the substantially conical bottoms of which said balls are seated, and said holes are of larger diameters than said balls.

10. The combination in a universal chuck of the center-adjustable type as set forth in claim 6, in which said flat in each ball subtends a cut-away part-spherical portion of no more than half the full sphere thereof.

11. The combination in a universal chuck of the center-adjustable type as set forth in claim 6, in which said flat in each ball subtends a cut-away part-spherical portion of less than half the full sphere thereof.

12. The combination in a universal chuck of the center-adjustable type as set forth in claim 6, in which said flat in each ball subtends a cut-away part-spherical portion of less than half the full sphere thereof, and each of said sockets is of such part-spherical extent as to permit insertion of a ball therein and its removal therefrom.

13. The combination in a universal chuck of the center-adjustable type as set forth in claim 6, in which said flat in each ball subtends a cut-away part-spherical portion of less than half the full sphere thereof, and each of said sockets is of a depth greater than the radius of a ball therein and is part-spherical at the bottom with the remainder of said socket formed to permit insertion of said ball therein and its removal therefrom.

14. The combination in a universal chuck of the center-adjustable type as set forth in claim 6, in which said flat in each ball subtends a cut-away part-spherical portion of less than half the full sphere thereof, and each of said sockets is of a depth greater than the radius of a ball therein and is semi-spherical at the bottom and for the remainder substantially cylindrical to permit insertion of said ball in to said socket and its removal therefrom.

References Cited in the file of this patent

UNITED STATES PATENTS

| | | |
|---|---|---|
| 1,559,033 | Cutler | Oct. 27, 1925 |
| 1,608,462 | Cutler | Nov. 23, 1926 |
| 2,513,606 | Wahnish | July 4, 1950 |
| 2,562,067 | Sloan | July 24, 1951 |
| 2,767,993 | Galler | Oct. 23, 1956 |

FOREIGN PATENTS

| | | |
|---|---|---|
| 624,144 | Great Britain | May 27, 1949 |